(12) United States Patent
Landvik et al.

(10) Patent No.: US 12,384,471 B2
(45) Date of Patent: Aug. 12, 2025

(54) AIR DEFLECTOR FOR A MOTOR VEHICLE

(71) Applicant: Volvo Truck Corporation, Gothenburg (SE)

(72) Inventors: Sondre Landvik, Gothenburg (SE); Adnan Hrustic, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 302 days.

(21) Appl. No.: 18/081,829

(22) Filed: Dec. 15, 2022

(65) Prior Publication Data
US 2023/0192202 A1 Jun. 22, 2023

(30) Foreign Application Priority Data
Dec. 20, 2021 (EP) ..................................... 21215843

(51) Int. Cl.
*B62D 35/00* (2006.01)
(52) U.S. Cl.
CPC .................................. *B62D 35/001* (2013.01)
(58) Field of Classification Search
CPC ... B62D 35/001; B62D 35/005; B62D 35/008
See application file for complete search history.

(56) References Cited

U.S. PATENT DOCUMENTS

| 4,357,045 A | 11/1982 | Kinford, Jr. |
| 2006/0152031 A1 | 7/2006 | Yuan |
| 2015/0108787 A1 | 4/2015 | Schmidt |

FOREIGN PATENT DOCUMENTS

| DE | 102015201188 A1 | 7/2016 |
| JP | S5795264 A | 6/1982 |
| WO | 2019115223 A1 | 6/2019 |

OTHER PUBLICATIONS

CN 109843704 A with English translation (Year: 2019).*
WO 2017/013047 A1 with English Translation (Year: 2017).*
European Search Report for European Patent Application No. 21215843.0, completed May 31, 2022, 6 pages.

* cited by examiner

*Primary Examiner* — Lori Lyjak
(74) *Attorney, Agent, or Firm* — Withrow & Terranova, PLLC

(57) ABSTRACT

An air deflector for a motor vehicle cab, the air deflector comprising an air inlet surface comprising at least one air inlet configured to receive an inlet airflow, an air outlet surface comprising at least one air outlet configured to expel an outlet airflow, at least one air duct for circulating an airflow, the at least one air duct connecting the at least one air inlet to the at least one air outlet, wherein the at least one air duct is a Venturi tube configured to increase the speed of the airflow circulating in the at least one air duct.

14 Claims, 2 Drawing Sheets

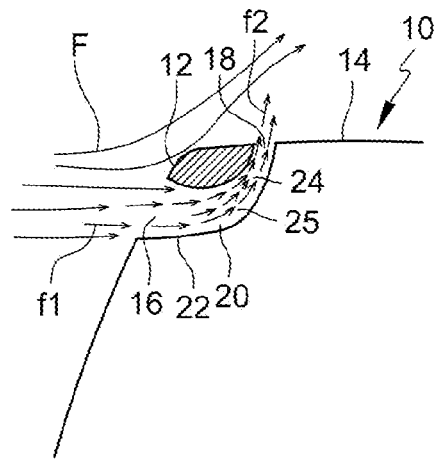
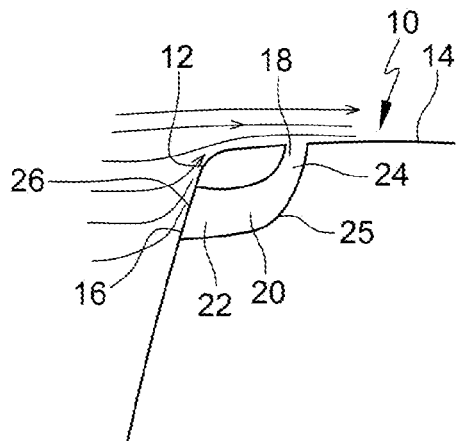
Fig. 3            Fig. 4
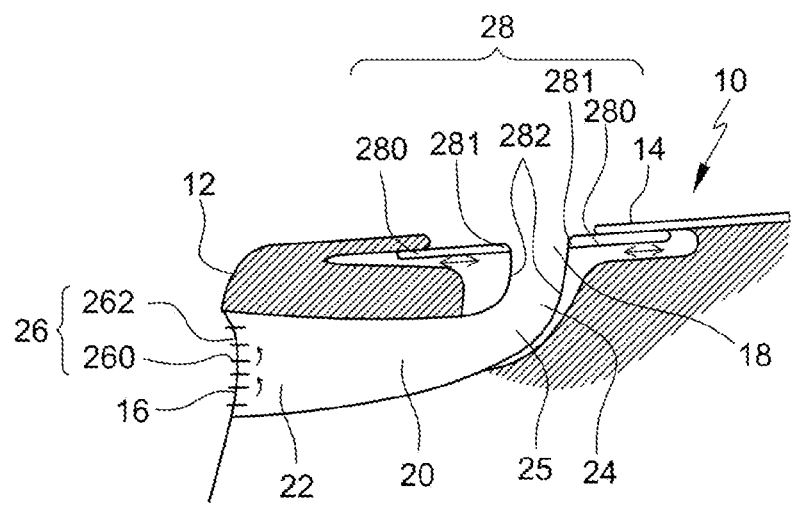
Fig. 5

AIR DEFLECTOR FOR A MOTOR VEHICLE

RELATED APPLICATIONS

The present application claims priority to European Patent Application No. 21215843.0, filed on Dec. 20, 2021, and entitled "IMPROVED AIR DEFLECTOR FOR A MOTOR VEHICLE," which is incorporated herein by reference in its entirety.

TECHNICAL FIELD

The invention relates to an air deflector for a motor vehicle and a vehicle cab comprising an air deflector.

The invention can be applied in low-duty, medium-duty and heavy-duty vehicles, such as trucks, buses and construction equipment. Although the invention will be described with respect to a truck, the invention is not restricted to this particular vehicle, but may also be used in other types of vehicles, preferably vehicles comprising a tractor unit and a trailer unit, of which reduction of air resistance is of particular interest.

BACKGROUND

In the field of vehicles, in particularly low-, medium- and heavy duty vehicles commonly referred to as trucks, it is well known that air resistance generates unfavorable forces during traveling, leading to e.g. reduced speed and increased fuel consumption. Normally, air resistance on a vehicle can be located to certain areas, such as the front surface of the vehicle, i.e. the wind shield, hood, etc. One area that is especially exposed to air resistance is the area of an associated trailer which area of the trailer is located above and behind the cab compartment of the vehicle. The upper part of the trailer front end which is exposed to the wind constitutes an important area of aerodynamic drag. It is thus desirable to reduce the air resistance at this position in order to e.g. reduce fuel consumption, etc.

Moreover, a cross section of the trailer in the direction of travel of the truck is generally larger than the cross section of the tractor. This can result in further air resistance.

To reduce air resistance, vehicles are often designed with a streamlined and thus more favorable aerodynamic shape. A common solution is to provide the vehicle with air deflectors so that the airflow can be diverted around the vehicle. On on-highway trucks, air deflectors, called roof deflectors, are generally located on top of the vehicle cab, i.e. on the vehicle cab roof. It is also known to place air deflectors, called side deflectors, on the lateral sides of the vehicle cab.

Conventionally, air deflectors are static parts, fastened to the vehicle. However, a truck is often used to pull trailers of different sizes. Therefore there is a need of using air deflectors which are adjustable according to the size of the trailer. Furthermore trailers can be uncoupled from the truck so that it is driven without a trailer. When driving without a trailer, the front surface of the truck is unnecessarily large, and efficiency is lost. To this end, it is known to use roof deflectors, which can be adjustable between a low position suitable for driving without a trailer and a top position adapted to the trailer height. In other words, roof deflectors can be adjusted according to the rear height, to accommodate different heights of the trailer. However, roof deflectors are usually large, even in low position.

Moreover, battery electric vehicles have a lower cab that traditional diesel trucks, which have very high cabs due to a large diesel engine that needs to fit underneath the cab. Thus, the height difference between the cab roof and the trailer is increased, which means the difference in front surface between trucks with and without trailer gets even bigger, and smarter aerodynamic solutions than the use of a very large air deflector are needed, in order to reduce drag and improve fuel efficiency and driving range.

SUMMARY

An object of the invention is to overcome or substantially improve one or more of the deficiencies of the prior art by providing an air deflector that can be adaptable to the dimensions of the motor vehicle, i.e. to the dimensions of a trailer and/or to the presence or absence of a trailer, to reduce drag and improve fuel efficiency and driving range.

The object is achieved by an air deflector.

By the provision of an air deflector which comprises at least one air duct in the form of a Venturi tube configured to increase the speed of the airflow circulating in the at least one air duct, the outlet airflow can form an air wall configured to deflect external air. The dimensions of the air deflector can be reduced in order to save fuel costs and to increase driving range.

According to one embodiment, the at least one air duct comprises an inlet portion and an outlet portion, the outlet portion being perpendicular to the air outlet surface, in order to orientate the outlet airflow perpendicular to the air outlet surface.

According to one embodiment, the at least one air duct comprises a bend. According to one embodiment, the at least one air inlet comprises an air inlet closure device.

According to one embodiment, the air inlet closure device comprises at least one flap.

According to one embodiment, the at least one air inlet comprises at least one slot that extends longitudinally across the air inlet surface.

According to one embodiment, the at least one air outlet comprises an air outlet closure device.

According to one embodiment, the air outlet closure device is configured to adjust the dimension of the outlet section of the outlet portion, in order to adjust the speed of the outlet airflow. Hereby, the air deflector can change the orientation of the outlet airflow to provide different aerodynamic behaviour depending on the dimensions of the vehicle to reduce fuel consumption.

According to one embodiment, the air outlet closure device comprises at least one shutter.

According to one embodiment, the air outlet closure device comprises two shutters facing each other, each shutter comprising a proximate end, proximate the other shutter, the proximate end being linked to a wall of the inlet portion by a deformable wall, such that the outlet section of the outlet portion decreases when the shutters translate one to the other.

According to one embodiment, the at least one air outlet comprises at least one slot that extends across the air outlet surface.

According another aspect of the invention, the object is achieved by a vehicle cab.

According to one embodiment, the at least one air deflector is integral with the vehicle cab.

According to one embodiment, the vehicle cab comprises a front side configured to receive an airflow during driving, a roof, lateral sides, and a rear side opposite the front side, and the at least one air deflector is a roof deflector arranged on the roof of the vehicle cab.

According to a further embodiment, the vehicle cab comprises a front side configured to receive an airflow during driving, a roof, lateral sides, and a rear side opposite the front side, and the at least one air deflector is a side deflector arranged at one of the lateral sides of the vehicle cab.

According to a further embodiment, the vehicle cab comprises at least a roof deflector and at least a side deflector.

According another aspect of the invention, the object is achieved by a motor vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3 is a schematic longitudinal section view of an air deflector according to an embodiment of the invention.

FIG. 4 is a schematic longitudinal section view of an air deflector according to an embodiment of the invention.

FIG. 5 is a schematic longitudinal section view of an air deflector according to an embodiment of the invention.

DETAILED DESCRIPTION

Figure 1:
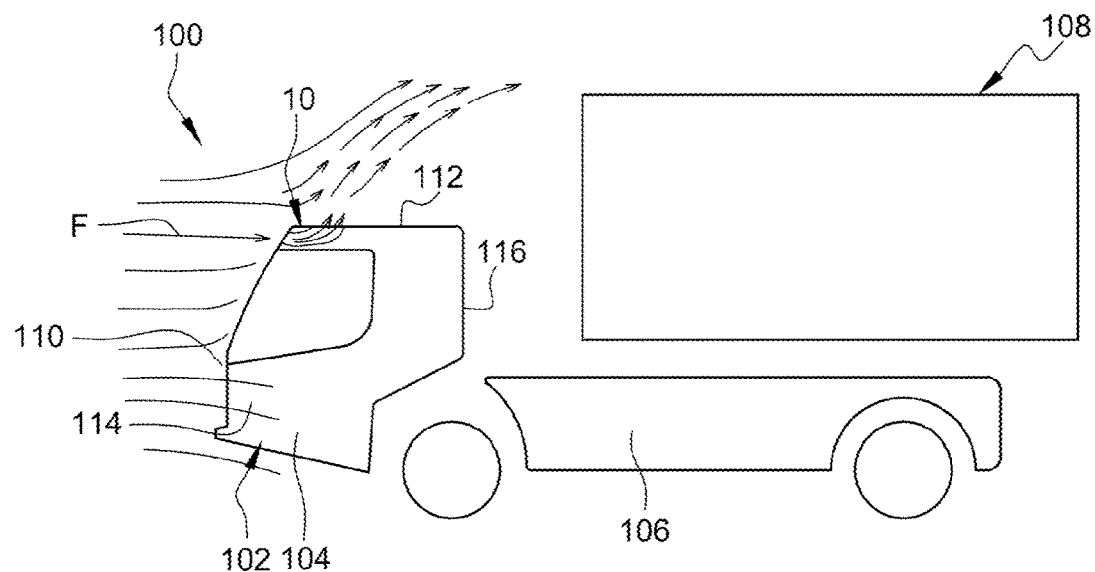
FIG. 1 is a schematic view of a motor vehicle comprising an air deflector according to an embodiment of the invention.
Figure 2:
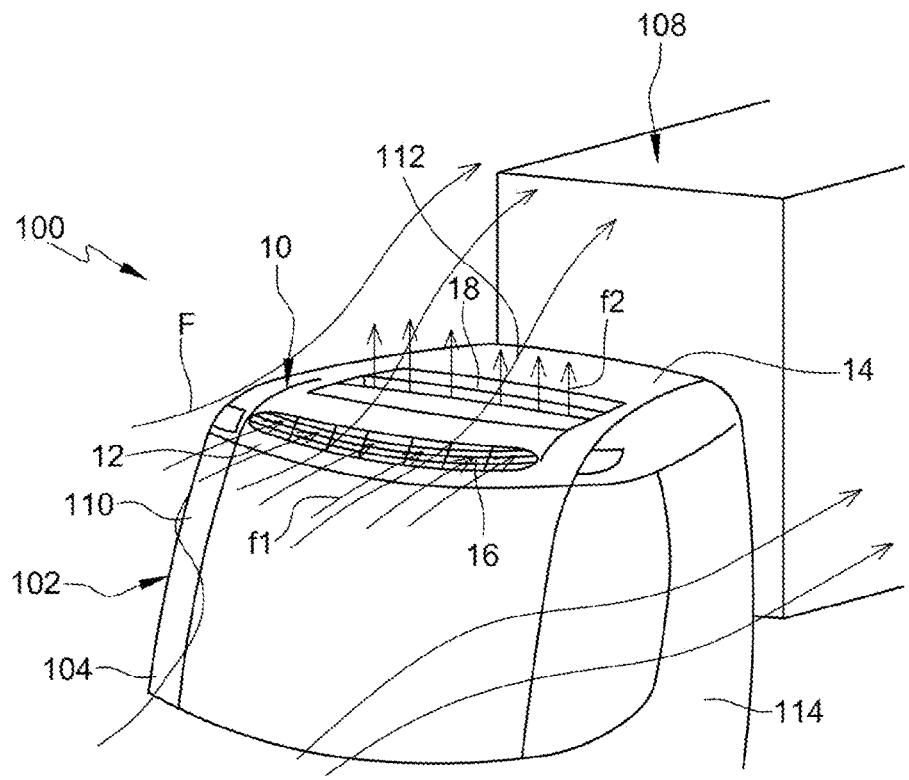
FIG. 2 is a schematic perspective view of a part of the motor vehicle of FIG. 1, showing the air deflector.

FIGS. 1 and 2 show a motor vehicle 100 comprising an air deflector 10 according to an embodiment of the invention. For example, the air deflector 10 can be configured to be disposed on the roof of the motor vehicle 100. The air deflector 10 can be a roof deflector. In alternative, the air deflector 10 can be configured to be disposed on at least one of the lateral sides of the motor vehicle 100. The air deflector 10 can be a side deflector.

The motor vehicle 100 can be a truck. The motor vehicle 100 can comprise a tractor 102 comprising a vehicle cab 104 and a vehicle frame 106. The motor vehicle 100 can comprise a trailer 108, preferably movable from the vehicle frame 106.

The motor vehicle 100 can comprise several air deflectors 10. The motor vehicle 100 can comprise at least one roof deflector and/or at least one side deflector.

The air deflector 10 can be configured to be disposed on the vehicle cab 104. FIGS. 1 and 2 show more particularly a vehicle cab 104 comprising an air deflector 10 according to an embodiment of the invention. The vehicle cab 104 can comprise at least one air deflector 10. The at least one air deflector 10 can be integral with the vehicle cab 104.

The vehicle cab 104 can comprise a front side 110 configured to receive an airflow F during driving, a roof 112, lateral sides 114, and a rear side 116 opposite the front side 110.

The air deflector 10 can be a roof deflector, configured to be disposed on the roof 112 of the vehicle cab 104. The roof 112 can comprise the air deflector 10. The air deflector 10 can be integral with the roof 112 of the vehicle cab 104.

The air deflector 10 can be a side deflector, configured to be disposed at one of the lateral sides 114 of the vehicle cab 104. The air deflector 10 can be integral with one of the lateral sides 114 of the vehicle cab 104. At least one of the lateral sides 114 can comprise the air deflector 10. Each lateral sides 114 can comprise the air deflector 10.

The vehicle cab 104 can comprise several air deflectors 10. The vehicle cab 104 can comprise at least one roof deflector and/or at least one side deflector.

The air deflector 10 can be configured to guide the airflow F around the motor vehicle 100 during driving.

FIGS. 2 to 5 illustrate that the air deflector 10 comprises an air inlet surface 12 and an air outlet surface 14. The air inlet surface 12 comprises at least one air inlet 16 configured to receive an inlet airflow f1. The air outlet surface 14 comprises at least one air outlet 18 configured to expel an outlet airflow f2. The air deflector 10 comprises at least one air duct 20 for circulating an airflow, the at least one air duct 20 connecting the at least one air inlet 16 to the at least one air outlet 18.

The air inlet surface 12 can be configured to receive the airflow F during driving. The air inlet surface 12 can be configured to be disposed on the front side 110 of the vehicle cab 104. The air inlet surface 12 can be configured to be disposed on the front side of the roof 112 vehicle cab 104.

The air outlet surface 14 can be configured to be licked by the airflow F during driving. The air outlet surface 14 can be configured to be disposed on the roof 112 of the vehicle cab 104. The air outlet surface 14 can be configured to be disposed on the top side of the roof 112 of the vehicle cab 104. The at least one air outlet 18 can be configured to be arranged on the front half of the roof 112, relative to the direction of travel of the motor vehicle. The at least one air outlet 18 can be configured to be arranged on the front third of the roof 112, relative to the direction of travel of the motor vehicle.

The air outlet surface 14 can be configured to be disposed at one of the lateral sides 114 of the vehicle cab 104.

The at least one air duct 20 is a Venturi tube. The at least one air duct 20 is configured to increase the speed of the airflow circulating in the at least one air duct 20. The at least one air duct can comprise a decreasing section from the at least one air inlet 16 to the at least one air outlet 18.

The at least one air outlet 18 can be configured to form an outlet air wall. If the air deflector is a roof deflector, the outlet air wall can be configured to be vertical.

The at least one air duct 20 can comprise an inlet portion 22 and an outlet portion 24. The outlet portion 24 is perpendicular to the air outlet surface 14. Therefore, the outlet airflow f2 is directed perpendicular to the air outlet surface 14.

For example, the outlet portion 24 can have an outlet section smaller than the inlet section of the inlet portion. The speed of the outlet airflow f2 can be greater than the speed of the inlet airflow f1.

For example, the ratio between the section of the outlet portion 24 and the section of the inlet portion 22 can be 2:1 inlet-to-outlet section ratio.

The at least one air duct 20 can comprise a bend 25. The bend 25 can be arranged between the inlet portion 22 and the outlet portion 24. The outlet portion 24 can be perpendicular to the inlet portion 22.

The at least one air duct 20 can be located inside the air deflector 10. The at least one air duct 20 can be located in the thickness of the air deflector 10.

As illustrated more particularly in FIGS. 4 and 5, the at least one air inlet 16 can comprise an air inlet closure device 26. The air inlet closure device 26 can be movable between an open position (FIG. 5) and a closed position (FIG. 4). The air inlet closure device 26 can be movable between an open position, a partially closed position and a closed position. The air deflector 10 can be an active air deflector, active when hauling a trailer 108 and inactive when driving without a trailer 108. The at least one air inlet 16 can be opened and the air deflection active when hauling a trailer. The at least one air inlet 16 can be closed when the vehicle is driving without a trailer.

The air inlet closure device 26 can comprise at least one flap 260. The at least one flap 260 can be movable in rotation. In alternative, the at least one flap 260 can be movable in translation. The at least one flap 260 can be movable between an open position and a closed position. The at least one flap 260 can be movable between an open position, a partially closed position and a closed position.

The air inlet closure device 26 can comprise several flaps 260. Each flap 260 can be configured to be operated individually. In alternative, the flaps 260 can be configured to be operated together.

The air inlet closure device 26 can comprise a grill 262 closing the air inlet 16. The grill 262 can comprise several openings, each opening comprising a flap 260.

The air inlet closure device 26 can be a manual air inlet closure device. The air inlet closure device 26 can be manually controlled.

In alternative, the air inlet closure device 26 can be an automatic air inlet closure device. The air inlet closure device 26 can be automatically controlled. For example, the air inlet closure device 26 can comprise a controller (not represented) configured to control the opening of the at least one air inlet 16 based on the presence or absence of trailer 108, or based on the dimensions of trailer 108.

For example, the air inlet closure device 26 can be controlled in closed position if an absence of trailer 108 is detected.

The at least one air inlet 16 can comprise at least one slot that extends longitudinally across the air inlet surface 12.

As illustrated more particularly in FIG. 5, the at least one air outlet 14 can comprise an air outlet closure device 28. For example, the air outlet closure device 28 can be movable between an open position and a closed position. For example, the air outlet closure device 28 can be movable between an open position and a partially closed position. For example, the air outlet closure device 28 can be movable between an open position, a partially closed position and a closed position. The air deflector 10 can be adjusted for different types of trucks, for example for trucks with different types of trailers or even open trailers, to provide different aerodynamic behaviour depending on need. This is much more versatile than a static deflector.

The air outlet closure device 28 can be configured to adjust the dimension of the outlet section of the outlet portion 24, in order to adjust the speed of the outlet airflow f2.

The air outlet closure device 28 can be configured to adjust the direction of the outlet airflow f2, depending for example on the speed of the vehicle, to optimize the drag coefficient of the motor vehicle.

The air outlet closure device 28 can comprise at least one shutter 280. The at least one shutter 280 can be movable in translation. The at least one shutter 280 can be movable between an open position and a closed position. The at least one shutter 280 can be movable between an open position, a partially closed position and a closed position.

The air outlet closure device 28 can comprise several shutters 280.

For example, the air outlet closure device 28 can comprise two shutters 280 facing each other. The shutters 280 can be configured to translate one to the other. Each shutter 280 can comprise a proximate end 281, proximate the other shutter 280, linked to a wall of the inlet portion 22 by a deformable wall 282, such that the outlet section of the outlet portion 24 decreases when the shutters translate one to the other. The deformable wall 282 can form the wall of the outlet portion 24. The air outlet closure device 28 can control the dimension of the outlet portion 24. The air outlet closure device 28 can control the speed of the outlet airflow f2, for example based on the dimensions of the trailer 108.

The air outlet closure device 28 can be a manual air outlet closure device. The air outlet closure device 28 can be manually controlled.

In alternative, the air outlet closure device 28 can be an automatic air outlet closure device. The air outlet closure device 28 can be automatically controlled. For example, the air outlet closure device 28 can comprise a controller (not represented) configured to control the opening of the at least one air outlet and/or the dimension of the outlet portion 24, based on the dimensions of trailer 108.

For example, the air outlet closure device 28 can be controlled in closed position if an absence of trailer 108 is detected.

The at least one air outlet 18 can comprise at least one slot that extends across the air outlet surface 14. If the air deflector 10 is a roof deflector, the at least one slot can extend transversally across the air outlet surface 14. If the air deflector 10 is a side deflector, the at least one slot can extend longitudinally across the air outlet surface 14.

In alternative, the at least one air outlet 18 can comprise several openings. For example, the openings can be aligned. For example, the openings can be arranged in a chevron pattern.

For example, the air deflector 10 can have a height of 10 cm. The air deflector 10 can be integrated in the roof of the vehicle cab. The air deflector can make it possible not to raise the vehicle cab.

For example, the length of the at least one air duct 20 can vary between 40-70 cm. The length of the air duct 20 will be a variant with a fixed ratio of the vehicle cab 104 length.

For example, the length of the air duct 20 can be 4 times shorter than the length of the vehicle cab 104. The length of the vehicle cab 104 can vary between, short cabin 160 cm up to a long cabin 230 cm.

It is to be understood that the present invention is not limited to the embodiments described above and illustrated in the drawings; rather, the skilled person will recognize that many changes and modifications may be made within the scope of the appended claims.

The invention claimed is:

1. An air deflector for a motor vehicle cab, the air deflector comprising:
   an air inlet surface comprising at least one air inlet formed in a cab front configured to receive an inlet airflow,
   an air outlet surface comprising at least one air outlet formed in a cab roof configured to expel an outlet airflow, and
   at least one air duct for circulating an airflow, the at least one air duct connecting the at least one air inlet to the at least one air outlet,
   wherein the at least one air duct is a Venturi tube configured to increase the speed of the airflow circulating in the at least one air duct, and
   wherein the at least one air inlet comprises a movable air inlet closure device.

2. The air deflector of claim 1, wherein the at least one air duct comprises an inlet portion and an outlet portion, the outlet portion being perpendicular to the air outlet surface, in order to orientate the outlet airflow perpendicular to the air outlet surface.

3. The air deflector of claim 1, wherein the at least one air duct comprises a bend.

4. The air deflector of claim 1, wherein the movable air inlet closure device comprises at least one flap.

5. The air deflector of claim 1, wherein the at least one air inlet further comprises at least one slot that extends longitudinally across the air inlet surface.

6. The air deflector of claim 1, wherein the at least one air outlet comprises an air outlet closure device.

7. The air deflector of claim 6, wherein the air outlet closure device is configured to adjust the dimension of the outlet section of the outlet portion, in order to adjust the speed of the outlet airflow.

8. The air deflector of claim 6, wherein the air outlet closure device comprises at least one shutter.

9. The air deflector of claim 8, wherein the air outlet closure device comprises two shutters facing each other, each shutter comprising a proximate end, proximate the other shutter, the proximate end being linked to a wall of the inlet portion by a deformable wall, such that the outlet section of the outlet portion decreases when the shutters translate one to the other.

10. The air deflector of claim 1, wherein the at least one air outlet comprises at least one slot that extends across the air outlet surface.

11. A vehicle cab comprising at least one air deflector according to claim 1.

12. The vehicle cab of claim 11, wherein the at least one air deflector is integral with the vehicle cab.

13. The vehicle cab of claim 11, wherein the vehicle cab comprises a front side configured to receive an airflow during driving, a roof, lateral sides, and a rear side opposite the front side, and wherein the at least one air deflector is a roof deflector arranged on the roof of the vehicle cab, and/or a side deflector arranged at one of the lateral sides of the vehicle cab.

14. A motor vehicle comprising at least one air deflector according to claim 1.

* * * * *